Oct. 21, 1930.   C. H. CONGDON   1,778,782
AIRCRAFT
Filed May 17, 1928   2 Sheets-Sheet 1
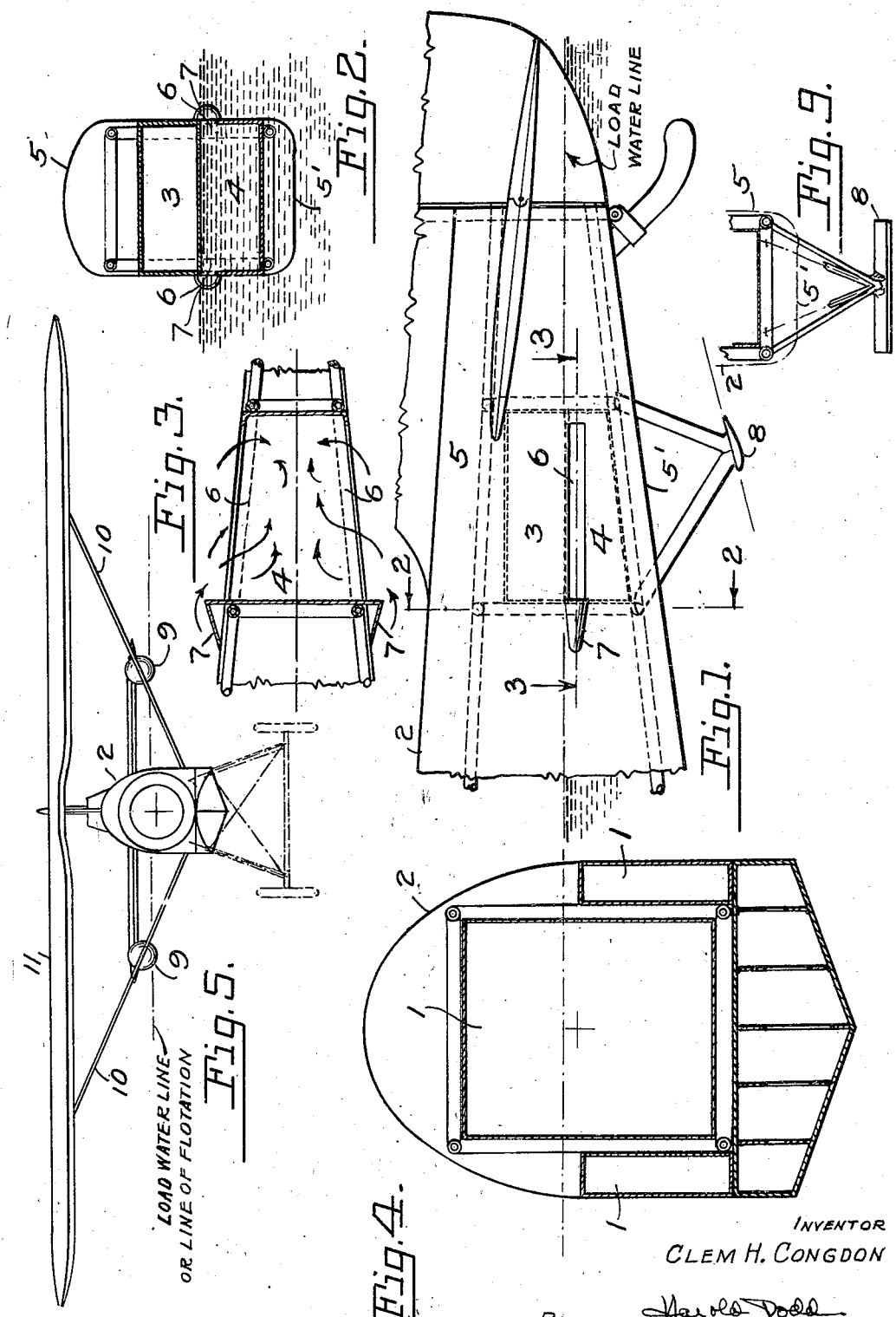
INVENTOR
CLEM H. CONGDON
BY Harold Dodd
ATTORNEY

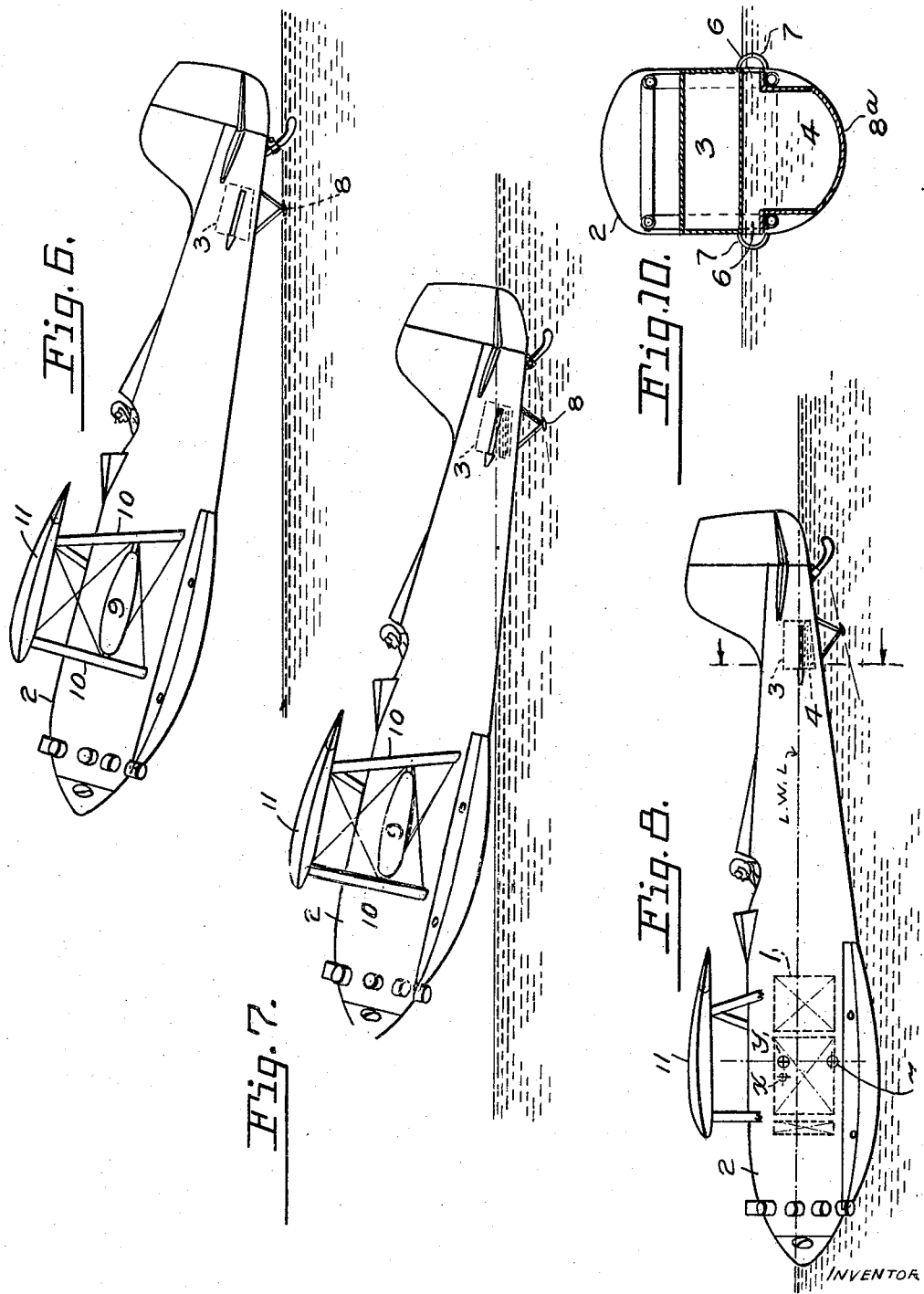

UNITED STATES PATENT OFFICE

CLEM H. CONGDON, OF CLEVELAND, OHIO

AIRCRAFT

Application filed May 17, 1928. Serial No. 278,510.

(GRANTED UNDER THE ACT OF MARCH 3, 1883, AS AMENDED APRIL 30, 1928; 370 O. G. 757)

My invention relates broadly to aircraft, and more particularly to a safety landing and flotation means for airplanes of the land type.

The principal object of my invention is to provide a means for keeping a land type airplane afloat on an even keel should it become necessary to make a forced landing on water.

Another object of my invention is the provision of a means for shifting the normal center of gravity of an airplane to coincide with a line perpendicular to the water line and through the center of buoyancy of the plane, so that it will float on an even keel when landing on water.

With the above and other objects in view the invention consists in the construction, combination and arrangement of parts as will be hereinafter more fully described.

Reference is to be had to the accompanying drawings, forming a part of this specification, in which like reference characters denote corresponding parts throughout the several views, and in which Figure 1 is a side view partly broken away of the tail portion of an airplane embodying the main features of my invention, Figure 2 is a sectional view on the line 2—2 of Figure 1, Figure 3 is a sectional view on the line 3—3 of Figure 1, Figure 4 is a view on a line approximately at the center of buoyancy of an airplane when it is in a horizontal position, showing in traverse section the forward or main flotation tanks, Figure 5 is a front view of an airplane showing embodiments of my invention, Figures 6, 7, and 8 are side views of an airplane at various positions when making a landing on water, Figure 9 is a front view of a means comprising a hydrovane or small inverted airfoil section, for submerging the tail portion of an airplane, and Figure 10 is a detail cross section showing a convex bottom for a tail portion of an airplane to produce a suction upon contact with water for submerging the tail portion.

In aircraft of the conventional monoplane or multiplane types used for land planes, there is not sufficient available space forward of the center of gravity or nose portion of the fuselage that can be utilized for buoyant members whether constructed as tanks, air bags, kapok, elder pitch, buoyant or partially buoyant wings, or the like, unless means is provided, preferably within the tail portion of the fuselage, for shifting the balance of the airplane upon entering the water when making a forced landing.

I have provided such a means, illustrated in the accompanying drawings, wherein 1 indicates airtight tanks or other buoyant means located in the forward fuselage 2 near or around the center of gravity X of the airplane, as shown in side view in Figure 8 and in cross section in Figure 4. There is also an airtight flotation tank or buoyant member 3 in the fuselage at or near the tail portion 5, a portion of which member is used for a balancing tank 4. The balancing tank is to cause the tail portion to be submerged, while the air in the buoyant member prevents complete submerging of the tail portion. When the tail portion of the airplane is brought into contact with the water, water spills into and fills the balancing tank through openings 6 along the sides of the tank at or near its upper edge, adding additional weight to the aft portion of the plane, shifting the center of gravity, as will be described hereinafter. Were it not for deflections 7 placed at the forward end of the openings, air would rush into the tank retarding the forward speed of the airplane while in normal flight.

In order to insure immediate submerging of the tail portion upon contact with the water, an auxiliary means, such as a hydrovane 8, is placed below and near the tank, as shown in the preferred embodiment of my invention illustrated in Figure 1. Immediately upon contact the hydrovane drags in the water causing the balancing tank to be carried below the surface and be filled with water, thus changing the trim of the airplane by weighting down the tail portion and causing the normal center of gravity X to be shifted rearwardly to Y, which point is in the center line of buoyancy Z when the plane is in the water in a normal horizontal position. The airplane will therefore ride in an approximately horizontal position, as illustrated in Figure 8, and can float with reasonable safety until a rescue can be effected.

The forward portion of the fuselage housing the airtight tanks 1 may preferably be made with a V-shaped bottom, see Figure 4, to ease the shock caused when landing on water, and the tail portion be made flat on the underside, as shown at 5' in Figure 2, with the hydrovane attached. A clear conception of the arrangement of the hydrovane and bottom of the fuselage may be gained by reference to Figure 9. As a modification, the after portion of the tail may have the underside of the fuselage terminate at the rear in a convex or rounded bottom, as shown at 8ª, Figure 10, which shape will create a suction along the bottom of the fuselage as the airplane moves along the surface of the water, filling the balancing tank 4. In the modified form the use of the hydrovane may be dispensed with.

The system of flotation described above possesses some degree of lateral stability on the water, but possibly an insufficient amount to maintain a normal position under all atmospheric or water conditions, hence I have contemplated the use of known auxiliary means for providing additional lateral stability or righting moment, such as wing tip floats, auxiliary floats located outboard from the longitudinal center line of the airplane, water tight wings in whole or in part. For the purpose of illustration I have shown my invention applied to a monoplane, and have provided additional lateral stability or righting moment by locating auxiliary flotation members 9 outboard from the fuselage, placing them on the diagonal struts 10, that constitute the wing bracing for the wings 11. In Figure 5 I have shown more clearly the arrangement of this auxiliary stabilizing means. Also in this view I have shown the wheels for making a normal landing upon land or a ship's deck, but it is to be understood that I contemplate dropping the wheels and landing struts while in the air when it is seen that it is necessary to make a forced landing on water. As the manner of dropping the wheels forms no part of the present invention, a detailed description of the means for accomplishing this is thought not required.

It will be understood that the above description and accompanying drawings comprehend only the general and preferred embodiment of my invention and that various minor changes in details of construction, proportion and arrangement of parts may be made within the scope of the appended claims and without sacrificing any of the advantages of my invention.

The invention herein described may be manufactured and used by or for the Government of the United States for governmental purposes without the payment to me of any royalty thereon or therefor.

Having described my invention what I claim as new is:

In an airplane, in combination, a fuselage, buoyant members in the forward part thereof, a receptacle in the aft part thereof and being provided with inlets along its sides for the intake of water when the tail portion of the fuselage rests upon water, deflectors attached to the inlets to eliminate the entrance of air into the receptacle while the airplane is in flight, and a buoyant receptacle superimposed upon said first receptacle to eliminate complete submergence of the tail portion of the fuselage when the said first receptacle is weighted with water.

CLEM H. CONGDON.